Nov. 12, 1968  I. BROWNING  3,410,190
COPYING METHOD AND APPARATUS
Filed May 19, 1966  2 Sheets-Sheet 1
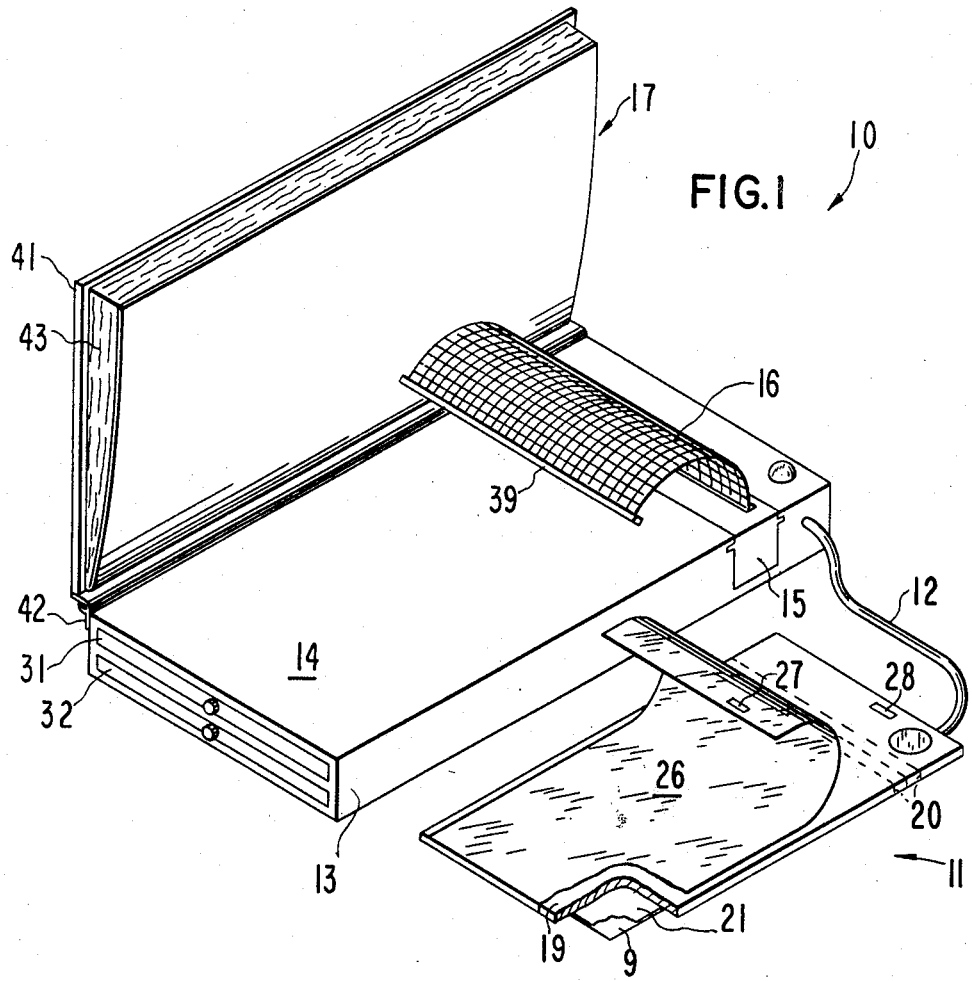
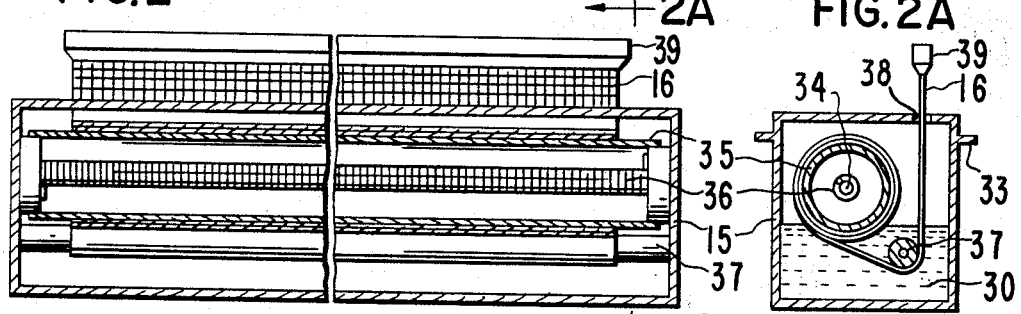
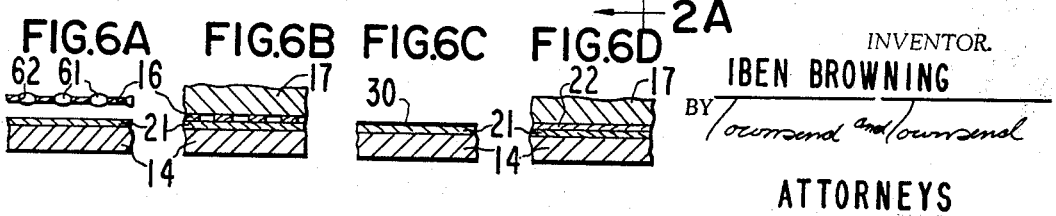
INVENTOR.
IBEN BROWNING
BY Townsend and Townsend
ATTORNEYS

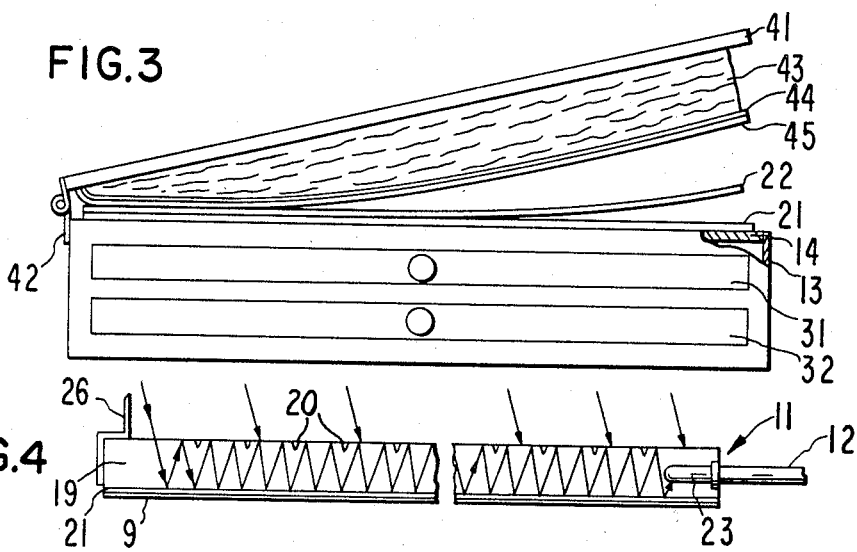
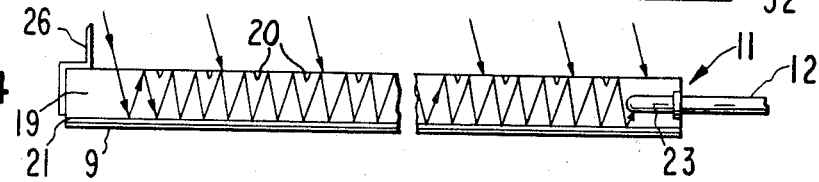
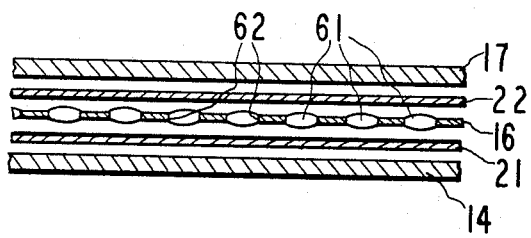
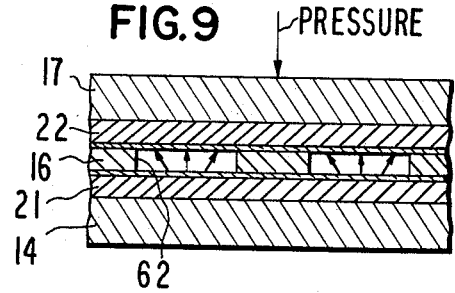
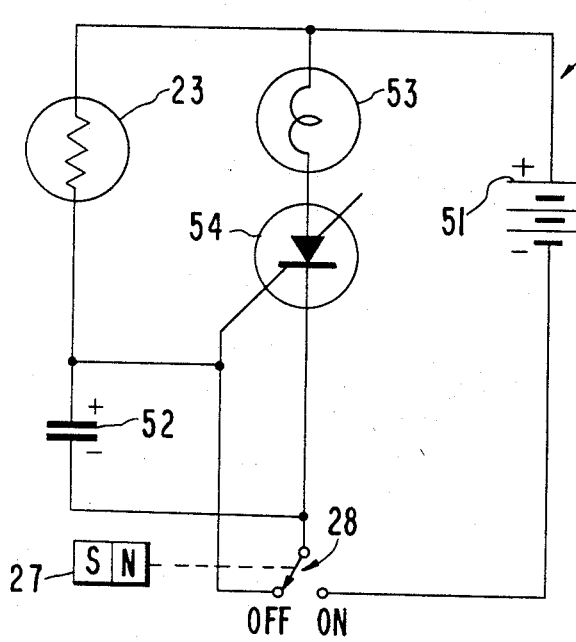
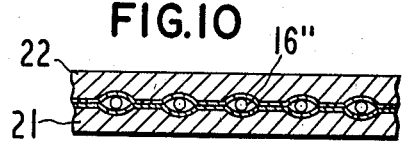
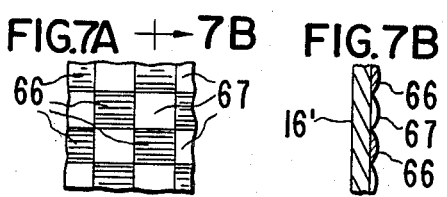

United States Patent Office 3,410,190
Patented Nov. 12, 1968

3,410,190
COPYING METHOD AND APPARATUS
Iben Browning, 1176 Sesame Drive,
Sunnyvale, Calif. 94087
Continuation-in-part of application Ser. No. 364,128,
May 1, 1964. This application May 19, 1966, Ser.
No. 551,274
13 Claims. (Cl. 95—13)

ABSTRACT OF THE DISCLOSURE

A method and apparatus for transferring information from the sensitive surface of a photonegative sheet to the sensitive surface of a photopositive sheet by utilizing a web matrix having interstices of a size suitable for retaining a predetermined amount of developing solution. The matrix is disposed within a container suitable for receiving the matrix in a rolled-up condition. When employed, the solution-retaining matrix is withdrawn from the container and placed in contact with the sensitive surface of one of the sheets to uniformly distribute the desired quantity of solution along the sensitive surface. The sensitive surfaces are then brought into confronting registration to develop a mirror image of the information on the photosensitive sheet.

---

This application is a continuation-in-part of my copending application Ser. No. 364,128, now abandoned, entitled Portable Copying Machine, filed May 1, 1964.

The present invention is directed to a copying method and apparatus and, more particularly, to a method and apparatus wherein a control solution such as a developer solution is delivered to a desired location by a web material.

In many applications it is desirable to convey a desired amount of operating solution from a source of supply to an operating location. One particular application which will be utilized by way of example to describe the method and apparatus in accordance with this invention is in the photocopying field.

Presently, all dry process copying machines operate on principles that inherently demand a source of electrical power. This requirement eliminates the use of these processes in portable machines designed to operate in environments where a powerful external electrical source is unavailable. This latter fact suggests the use of a wet process machine for such environments.

In all presently manufactured wet process copy machines wherein a copy of graphic information is produced by diffusion transfer from a photonegative to a photopositive, the positive and/or exposed negative paper are guided through a chemical bath or over a surface wetting roller and then squeezed by passage through a system of rollers. Typically, these machines require an electric motor and its necessary source of power to drive the rollers.

The object of the present invention is to provide a method and apparatus for controlling a solution so that when utilized in a photocopying process the copy can be produced at any location without the necessity for an external source of electrical power to operate the process.

Broadly stated, the present invention to be described in greater detail below is directed to a method and an apparatus for accomplishing the method in which an image of the information to be recorded is formed on a sheet comprising the steps of uniformly wetting a matrix sheet with operating solution so that the desired amount of the solution is retained by the sheet, moving at least the portion of the matrix with the retained solution to location for operation by the solution, contacting the matrix sheet with a sensitized sheet and reacting the solution with the sensitized sheet to develop information on the sensitized sheet. As applied to a photocopying method and apparatus, the operating solution is a developer which is conveyed to at least one of the confronting surfaces of a pair of photopositive and photonegative sheets and the sheets brought into sufficiently close proximity to one another to wet both confronting surfaces with developer solution and produce an image of graphic information on the photopositive sheet.

This method and apparatus permits the conveyance of the desired amount of operating solution or developer to the sensitized sheets rather than the conveyance of the sheets to the solution. Thus, the method is accomplished without the necessity for removal of excess solution or developer from the sheets. Furthermore, the method can be accomplished manually, thereby avoiding the necessity for an external power source to operate the method.

The method and apparatus of the present invention lend themselves ideally to a portable copying machine in which ambient illumination is utilized to produce the exposure of a photosensitive copy paper. A machine which operates by such an exposure is described in my copending application referred to above. That application is directed to a portable photonegative exposure apparatus having a light-tight compartment for holding exposed and nonexposed photosensitive copy paper and a light integrating timer for measuring the total amount of ambient light incident on a copying platform for an extended period of time for determining the proper exposure for the photosensitive copy paper.

A portable copy machine in accordance with the present invention is especially advantageous for information searches that are made in facilities such as libraries and document depositories where copies must be made from a number of different volumes and/or from large documents which are either impossible or impractical to remove from the premises. While some libraries have copying facilities, it is much more convenient to make the desired copy as soon as the matter to be copied is located rather than proceeding with the time consuming process of arranging for copies to be made by the library. Additionally, most libraries do not permit private electrical machines to be plugged into their electrical systems. A machine in accordance with the present invention can be no bigger than an attache case which can be easily transported into a library and operated without a great deal of difficulty and without the need for connection to an electrical outlet. One aspect of the present invention provides a manually operated method and apparatus which can produce the desired copy at the source of information to be copied so that it is immediately known that an adequate copy has been obtained.

The method and apparatus in accordance with the present invention as applied to a portable copy machine are particularly well suited for use with transilluminated copy paper which avoids the problems encountered by variations in the transparency of the sheet to be copied and permits copying large works such as maps, graphs, charts, etc., in segments which can later be pieced together.

In accordance with the present invention the matrix sheet or material utilized to effectively transport the operating solution from the solution source to the operating location can take a number of different forms. For the application of a photocopying method and apparatus the sheet or material can be a thin porous web provided with small holes or pores or interstices in which the solution is retained and/or provided with a nonwetting material such as Teflon in substantially uniformly distributed spaced apart areas defining second areas therebetween on which the solution is retained. The composition and dimensions of the web material as well as the size of interstices, the nature of the nonwetting material and the characteristics of the operating solution are selected such that the desired amount of solution is retained by the web material.

Since the invention accomplishes geometrical mechanical delivery of an operating solution, the solution can be applied to any geometry into which the web material can be transformed and the web material can be made in various forms such as in flexible sheet formable to conform to most any desired configuration. Furthermore, while the geometrical distribution of the operating solution can and usually is uniform across the web material for uniform distribution of the solution, the distribution can be changed by change in the configuration or character of the web material as desired such as, for example, to concentrate operating solution in a particular geometrical arrangement.

In accordance with another aspect of the present invention, a timing platen for covering the material to be copied is provided which is movably secured to the remainder of the machine and can be placed at various desired locations such as on the pages of a book, on a portion of a large document, against a vertically oriented sheet, etc. This feature makes the copying apparatus especially useful as a portable machine where documents to be copied are expected to be in various physical arrangements both in their physical configuration and the position in which they must be copied.

In accordance with another aspect of the present invention, a transparent timing platen is provided for placement on the portion of the graphic material to be copied and removal of the opaque flap to serve as initia-platen to detect the amount of light internally reflected within the platen which light is an analog of the ambient illumination directed through the platen onto the copy paper therebelow. This construction permits placement of the platen on small as well as large objects to be copied and also serves to flatten the sheet being copied while giving an accurate representation of the amount of light actually incident on the photosensitive sheet.

In accordance with another aspect of the present invention, an opaque flap is provided on the surface of the timing platen for permitting positioning of the timing platen and photosensitive paper on the article to be copied and removal of the opaque flap to serve as initiation of the timing cycle during which the sensitized paper is exposed to ambient illumination. In accordance with this aspect of the present invention, the opaque flap is provided with means cooperating with the timing circuit to initiate the timing cycle.

Another aspect of the present invention is the provision of a magnetic switch secured to the platen of the last aforementioned aspect for initiating the timing cycle and the location of a magnet on the opaque flap to operate the switch when the opaque flap is lifted from the platen. Thus, with this construction removal of the opaque flap from the timing platen effectively closes the circuit in the timing cycle to measure the ambient illumination on the photosensitive paper.

Other objects and advantages of this invention will become apparent when reading the following description and referring to the accompanying drawing in which similar characters of reference represent corresponding parts in each of the several views.

In the drawings:

FIG. 1 is a perspective view partially broken away of a portable copy machine in accordance with the present invention with certain portions of the structure partially displaced to illustrate their operation;

FIG. 2 is an enlarged cross-sectional view of the developer container portion of the structure shown in FIG. 1;

FIG. 2A is a cross-sectional view of a portion of the structure shown in FIG. 2 taken along line 2A—2A in the direction of the arrows;

FIG. 3 is an enlarged end view of a portion of the structure shown in FIG. 1 illustrating the operation thereof;

FIG. 4 is an enlarged foreshortened side view of the timing platen portion of the structure illustrated in FIG. 1;

FIG. 5 is a schematic circuit diagram illustrating a timing circuit that can be utilized with the present invention;

FIGS. 6A–6D are enlarged elevational fragmentary sectional views illustrating operation of one aspect of the present invention;

FIGS. 7A and 7B are respectively enlarged front and side views of another embodiment of the present invention;

FIG. 8 is an enlarged fragmentary, elevational, sectional view illustrating another aspect of the operation of the present invention;

FIG. 9 is an enlarged sectional view schematically illustrating another placement of the structure shown in FIG; 8; and FIG. 10 is an enlarged sectional view schematically illustrating the operation of another aspect of the present invention.

In its broadest aspects the present invention is directed to method and apparatus for controllably positioning desired amounts of operating solutions on a web material and transporting the solution by a movement of the material to operating location. The solution is geometrically positioned for operations thereon or merely for geometrical location on another member. The term web material is utilized to describe screen-like members of materials either metallic or nonmetallic and formed by any method such as, for example, etched or woven, which will retain the desired solution either in the interstices or on designated portions thereof for transport from the solution source to a surface to be treated thereby. Although the invention is applicable to many fields and for many uses, one primary application is for the geometrical mechanical delivery of liquid chemicals such as developer to situs for use. Therefore, the invention will be described by way of illustrative example as applicable to a portable photocopy machine as illustrated in the drawings.

Referring now to the drawings with particular reference to FIG. 1, there is illustrated a portable copying device 10 for copying graphic information contained on a sheet 9 such as, for example, a typewritten or printed page or photograph containing graphic information. The copying device 10 includes a timing plate 11 shown in accordance with one aspect of the present invention as movably connected via a cable 12 to a casing 13 provided with a copy producing platform 14, a container 15 for holding a sheet of web material 16 which passes through a developer solution (see FIG. 2A) and a pressure applicator 17 for applying pressure to sheets of material placed upon the platform 14.

The timing platen 11 of the portable copying device 10, which is particularly well suited for use with transilluminated photonegative sheet material 21 for the production of an image on a photopositive sheet material 22, includes a transparent plate 19 such as, for example, Plexiglas, the upper surface of which is treated such as with transversely extending scorelines 20 for enhancing the amount of internal reflections therein from ambient illumination directed thereonto. A photoresistor 23 connected via cable 12 in a timing circuit 25, to be described in greater detail below with reference to FIG. 5, is positioned within one end of plate 19 for receiving light via internal reflections within plate 19. In this specific example the photoresistor 23 is selected so that the light received by photoresistor 23 inversely determines its resistance for providing a reading of the ambient illumination directed onto the transilluminated photonegative 21 positioned below the plate 19 on top of the sheet 9. Thus, a high level of ambient illumination produces a low resistance in the photoresistor 23, while a low level of ambient illumination produces a high resistance.

An opaque flap 26 such as, for example, of black felt, is removably positioned on the top surface of plate 19 such as by being secured with an adhesive to the end of the plate 19 opposite the end at which the photoresistor 23 is located. This flap 26 serves to shield the photosensitive paper located beneath the plate 19 until it is desired to initiate the exposure. To initiate the timing cycle measured by timing circuit 25 as described below, the flap 26 cooperates with a switch 28 in the timing circuit 25 to turn on the timing circuit when the flap 26 is removed from the top surface of plate 19. The particular switch connection provided is a small bar magnet 27 secured to the flap 26 and located over a magnetically operated reed switch 28 such as, for example, a magnetically operated single pole double throw switch connected in the timing circuit 25 via the cable 12 running from the timing plate 11 to the remaining components of the timing circuit 25 located in the casing 13 thereby permitting placement of the timing platen 11 in various positions where copies are desired to be made such as, for example, on the page of a book, at one of a number of positions on an enlarged document, such as a map or chart or against a vertically oriented object such as a hanging picture or a mural.

The casing 13 includes light tight compartments 31 and 32 for storing photonegative and photopositive sheets 21 and 22, respectively. Also, besides housing the components of the timing circuit, the casing is constructed to hold the developer container 15.

Referring now to FIGS. 1, 2 and 2A, the developer container 15 formed of, for example, plastic, is constructed in a fluid tight manner and provided with flanges 33 adapted to slidably fit in a flange receiving portion of the casing so that after the container 15 has been utilized to produce a designated number of copies, it can be replaced with a fresh cartridge. Rotatably mounted within the container 15 on an axle 34 is a drum 35 which is urged by a spring 36 to wind the web material 16 on the drum within the container 15. A shaft 37 is also mounted within the container 15 at such a level that the web material 16 trained therearound passes through the developer solution 30 and out through an elongate slot 38 in the top of the container 15. The outer end of the web material 16 is provided with a gripping bar 39 having sealing material such as rubber adjacent its attachment to the web 16 for sealing the slot 38 when the web material 16 is retracted into the container 15 by the action of spring 36. With this construction the portable copying device 10 can be packaged for transportation in a carrying case and the developer solution in the container 15 will not spill therefrom during transport of the device.

Referring now to FIGS. 1 and 3, the pressure applicator 17 includes a rigid lid member 41 secured to the casing by a hinge 42 extending along a longitudinal edge of the casing 13. A sponge member 43 such as of foam rubber is secured to the surface of the lid 41 facing casing 13 and provided on its exterior surface with a thin sheet of hard material 44 such as tin or Formica, which is in turn covered on its other broad surface with a thin sheet of resilient material 45 such as urethane sponge. The sponge rubber member 43, sheet 44, and resilient material 45 are dimensioned to provide progressive contact between the pressure applicator 17 and material placed on the platform 14 as the lid 41 is closed down upon the casing 13.

The timing circuit 25 which is illustrated in FIG. 5 includes a power source such as a battery 51 connected through the photoresistor 23, a charging capacitor 52 and the switch 28 back to the battery 51. Shunted across the photoresistor 23 and the charging capacitor 52 is an indicating lamp 53 which is visible from the exterior surface of casing 13 of the copying device 11 and which is in series with a silicon controlled switch 54 for turning on the indicating lamp 53 when the charging capacitor has charged to a particular switching voltage. The off position of switch 28 breaks thec onnection to the battery 51 and shorts the capacitor 52 so that the capacitor is at zero voltage when a timing cycle is initiated by removal of the flap 26 to move the magnet 27 away from switch 28.

The portable copying device 10 is operated by the procedure described below. First, a photonegative sheet 21 is removed from one of the compartments 31 and 32 and placed with its photosensitive surface directed down on top of the sheet 9 containing the graphic information to be copied. The timing platen 11, with opaque flap 26 covering the top surface thereof so that the bar magnet is in position over switch 28, is placed on top of the photonegative sheet 21. The opaque flap is then removed from the timing plate, thereby removing the magnet 27 from the switch 28. This in turn closes timing circuit 25 so that the discharging capacitor 52 charges up in proportion to the light internally reflected within plate 19 and incident on the photoresistor 23 over the time interval beginning from removal of the flap 26. The grooves 20 in the upper surface of plate 19 enhance light reflections internally of the plate 19 in variable accordance with the amount of ambient illumination incident upon and transmitted through plate 19 to the transilluminated photonegative sheet 21. When the battery power is switched on, the capacitor 52 charges exponentially toward the battery voltage at a rate determined by the values of the photoresistor 23 and the charging capacitor 52. This rate of charge is determined directly by the amount of light reaching the photoresistor 23. When the charge on the capacitor 52 has reached a preselected desired voltage corresponding to the desired amount of integrated light incident on the transilluminated photonegative, switch 54 operates to turn on the indicating lamp 53 to show that the desired exposure time has elapsed so that a photopositive copy can be made from the photonegative sheet. Instead of separately placing the plate 11 and photonegative sheet 21 on the sheet 9, this placement can be accomplished all in one step if desired.

The exposed photonegative 21 is transferred face up onto copying platform 14 for distribution of developer thereonto. With an active developer cartridge 15 in place, the web material 16 is drawn out of the container 15 by pulling the gripping bar 39 whereby the web material is unrolled from the drum 35, trains around shaft 37 within the developer solution 30 and pulls out of the container 15 through slot 38 with developer solution contained within the interstices of the web material. The wet web 16 with the solution droplets 61 contained in the interstices 62 is then placed over the photonegative 21 (see FIG. 6A). In this position the hinged lid 41 is pressed down on the web material 16 to put the material in good contact with the photonegative sheet 21 and spread the developer fluid 30 evenly over it (see FIG. 6B). The hinged lid 41 is then raised, leaving the developer 30 substantially evenly distributed over the photonegative 21 (see FIG. 6C), the web material 16 allowed to retract into the container 15 and a photopositive sheet 22 placed emulsion side down on the wetted negative. The hinged lid 41 is again pressed down to put the positive and negative in close contact (see FIG. 6D). When the pressure is released, the photonegative and positive sheets 21 and 22 respectively are allowed to remain in contact for a few seconds before they are separated, and after separation the photopositive now carries a positive copy of the original graphic information.

The construction of the web material 16 is important. The thickness of the material 16 and the size of the interstices should not be so large that the amount of chemical provided by the emulsion becomes watered down to the point where it fails to make a dark spot on the positive where one is to be produced. Naturally, the parameters depend on the type of sensitized paper. By way of example, when utilizing different types of commercially available transilluminated photocopy paper, a normal muslin shirt fabric serves satisfactorily as the web material 16.

As an alternative to the use of a muslin shirt type of material 16, and as shown in FIGS. 7A and 7B, the solution retaining material can be an impervious sheet material 16' as shown in FIGS. 7A and 7B with a nonwetting material 66 arranged in spaced apart areas in a pattern across the sheet 16' to define second areas 67 in between the areas of material 66 so that the operating solution is retained in these second areas 67 when the sheet 16' is wetted with operating solution. Additionally, the porous web material 16 described above can be formed or woven of a nonwetting material so that the surface tension of the droplets 61 is greater and more solution carried by a web 16 of a given thickness.

The construction of the hinged lid 41 such that pressure is progressively applied across the platform 14 is important for pressing all bubbles out ahead of the initial contact line and this line moves across the sheet placed on the platform 14. This progressive contact is important, both for wetting the paper and for subsequently pressing the negative and positive together, for without this progressive contact pockets of air or of fluid or wrinkles in the screen or paper prevent uniform smooth contact and garble the image.

It has been discovered that the lower surface of the pressure applicator 17 should be quite firm to provide sufficient pressure but the surface should be slightly yieldable or spongy to compensate for irregularities in the paper, foreign articles that might exist on the sheets, or platform 14, or irregularities in platform 14 itself.

While the platform 14 and timing platen have been described as separate elements, they can actually be one and the same element to reduce the size and cost of the copying machine.

In accordance with another aspect of the present invention as illustrated in FIGS. 8 and 9, the web material 16 can be retained between the photonegative and photopositive sheets 21 and 22 respectively and an image created on the photopositive by diffusion transfer. In this case the photopositive sheet 22 is laid, emulsion side down, on top of the previously extended screen 16, and the whole sandwich is pressed firmly together by the pressure applicator 17 to insure good contact between the sheets and web material. With this contact as illustrated in FIG. 9 diffusion transfer takes place from the photonegative 21 to the photopositive 22 via the developer solution contained within the web material 16. The image that is produced on the photopositive sheet 22 is well defined because the total visual effect is produced by a great many individual diffusion transfers, each occurring within the limits of one tiny droplet 61 of developer solution. Each droplet 61 is physically separated from every other droplet 61 and is operating independently. This process keeps the lateral diffusion of developer solution within acceptable limits.

In practice it has been discovered that the web material 16 utilized for producing photocopies via this diffusion transfer process should have at least 100 holes per linear inch to resolve ordinary typewritten material satisfactorily. The number of holes required is largely a matter of personal taste as well as a matter of physics. It has been discovered that a screen or web material having 250 holes per linear inch with seventy percent open area produces very good results. The image produced is subdivided into spots, much on the order of a standard half-tone. The contrast in the image is limited to the percent of open area. Again, for the diffusion transfer process, the thickness of the screen or web material is an important factor. The size of the droplet 61 must not be too large. It has not been possible to make a transfer from a photonegative to a photopositive utilizing a screen thicker than about 2 mils.

Since the screen must be thin, it must also be strong. Various materials as described above have been tested. These have been both metallic and nonmetallic, etched and woven. All materials tested have performed successfully, but a woven screen required greater applied pressure to prevent leakage of fluid from one pore or aperture 62 to the next.

Since in making diffusion transfer copies the necessarily small holes will ultimately get clogged with gelatinous emulsion and with crystallizing chemicals from the developer fluid, the web material as well as the developer solution is likely to have a limited life and therefore these elements are beneficially contained in a disposable cartridge useful for a given number of copies such as 50 so that the cartridge can be replaced with another cartridge after the most efficient number of copies has been made.

In accordance with another aspect of the present invention as illustrated in FIG. 10, the screen or web member 16" utilized to carry the developer solution is constructed with proportionately large holes, pores or interstices so that a contact print can be made. It has been discovered that a good material is nylon hose netting 16" such as fifty denier having very fine nylon filaments spaced apart so that there is an open area across the web 16 on the order of about 98 percent. When the photonegative and photopositive sheets 21 and 22 are pressed together with this screen member 16" between them as shown in FIG. 10, the papers actually came in contact with each other through the large interstices or holes thereby making an ordinary contact copy. In this situation the web material is simply a fluid carrier and does not serve as a limiter of lateral diffusion. The resulting image shows the pattern of the screen or web material crisscrossing the information produced on the sheet but the effect is acceptable.

It will be appreciated that in methods described above instead of first placement of the negative face up on the platform 14, the positive can be first placed face up and the operating solution applied to the photopositive.

As pointed out the present invention has applications other than use in a portable photocopy machine and various modifications can be made in the method and apparatus when it is applied to other applications. For example, a screen or web material can be utilized for geometrically controlled liquid chemistry. In such use, the screen or web material can be provided with an operating solution on a surface or in the interstices thereof such as passing the web material as described above through a reservoir of a particular solution and the web material moved to a desired location for operation of the solution. In one example, the solution may be photosensitive and with the solution arranged in the interstices of the web material and the web material positioned in the desired location, an image can be directed upon the material and thus upon the solution to produce a chemical reaction in the solution. Thereafter, the reacted solution in the interstices of the web material is brought into contact with a sheet of printing paper on which the reacted solution will produce a reproduction of the image previously directed onto the web material.

While it is believed that sufficient information has been given by way of example above for construction of a practical embodiment of this invention, in the following table specific designation of operable elements for a timing circuit for utilization with the present invention is given.

TABLE

| Ref. No. | Element | Description |
| --- | --- | --- |
| 23 | Photoresistor | ORP60. |
| 27 | Magnet | H–33. |
| 28 | Switch | Hamlin DRG-DTH. |
| 51 | Battery (2) | 1½ v., RCA VSO |
| 52 | Charging capacitor | 36 100 μF, 6 v. |
| 53 | Lamp | No. 48 bulb. |
| 54 | Switch | GE type 3N84. |

While the embodiment of the invention illustrated in FIGS. 1-6 has been described with portions of the timing circuit contained in casing 13, all of the components for operating the timing cycle can be housed within the plate 11.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. Apparatus for copying information comprising: a container for an operating solution; a matrix material having means to retain operating solution in a first region geometrically distributed thereacross; means for mounting said matrix material relative to solution in said container for movement from a first position in which solution is picked up by said material to a second position when said material is located for operation of the solution retained by said material and means for providing relative movement between said matrix material and a member onto which the information is to be developed to bring the solution retained by said matrix material into contact with said member.

2. The apparatus of claim 1 characterized further in that said matrix material is a thin porous web having interstices which retain operating solution.

3. The apparatus of claim 1 characterized further in that said matrix material includes means defining regions repelling operating solution thereby defining second regions between said first regions for retaining solution.

4. Apparatus for copying graphical information comprising a container for an operating solution, a flexible sheet of web material having interstices dimensioned to carry said operating solution; and means for moving said web material from a position in which solution is picked up in the interstices of said material to a second position where said material is brought into contact with the surface of the sheet on which information is to be developed whereby operating solution is deposited on the surface of said sheet material.

5. A portable copying machine for producing copies of graphical material on photosensitive copy paper comprising, in combination: a casing having a platform; a container for developer solution, means for detachably connecting said container to said casing for placement of said container, a length of web material, means for mounting said web material in said container for picking up and retaining developer solution and permitting a substantial length of said material to be withdrawn from said container and laid upon a sheet of copy paper on said platform thereby to wet the surface of said sheet of copy paper with developer solution and pressure generating means secured to said casing for pressing a second sheet of copy paper into close proximity with said surface of said first sheet of copy paper for transferring an exposed image from one of said sheets to the other of said sheets.

6. The machine of claim 5 characterized further in that said web material is a thin porous matrix having interstices which retain developer solution.

7. The machine of claim 5 characterized further in that said web material includes means defining substantially uniformly distributed regions repelling developer solution thereby defining second regions between said first regions for retaining developer solution.

8. The method of transferring an image of information to be recorded on a sensitized sheet, comprising the steps of: immersing in a bath of solution a web matrix having interstices of a size suitable for retaining a predetermined amount of said solution; moving said matrix with retained solution out of said bath to a location for operation by the solution; and thereafter contacting the matrix with a sensitized sheet to cause the solution to react with said sheet and transfer an image of said information to said sheet.

9. The method in accordance with claim 8 including the steps of: first forming an image of information to be recorded on the sensitized surface of a photonegative sheet, providing a photopositive sheet having a sensitized surface for registration with the sensitized surface of said photonegative sheet and carrying the solution in the interstices of the web matrix to at least one of the sensitized surfaces of the photopositive and photonegative sheets.

10. In a method for producing a copy of information wherein the light sensitive surface of a photonegative sheet is first exposed to said information for a time sufficient to produce an image of said information and then a mirror image of the image present on the light sensitive surface of said photonegative sheet is formed upon the sensitive surface of a confronting photopositive sheet through application of a developer solution between said sensitive surfaces, the improvement comprising: providing a container of developer solution and a web matrix having interstices of a size suitable for retaining a predetermined amount of developer solution; maintaining said matrix within said solution to provide said matrix with said predetermined amount of solution; withdrawing said matrix from said container; transferring a quantity of said retained solution from said matrix to at least one of the sensitive surfaces of said photopositive and photonegative sheets by contacting said matrix with said at least one sensitive surface, and moving said sheets into close proximity so that said solution will wet the sensitive surfaces of said sheets, whereby said solution will cause said mirror image to be formed on the sensitive surface of said photopositive sheet.

11. The method in accordance with claim 10 wherein said step of transferring developer solution to one of said sensitive surfaces includes pressing the web material containing the solution in the interstices thereof against the photonegative sheet and removing the web matrix from said photonegative sheet and returning said matrix to the bath of solution prior to providing the confronting registration of said photopositive and photonegative sheets.

12. The method of claim 10 wherein said step of transferring said developer solution to one of said sensitive surfaces and bringing the photopositive and photonegative sheets in close proximity to one another includes the steps of: placing web material containing the developer solution in the interstices thereof on one of said sensitive surfaces and bringing the other of said sensitive surfaces into contact with the other side of the web material whereby the information recorded on the photonegative sheet is transferred to the photopositive sheet via the developer solution in the interstices of the web material.

13. A method in accordance with claim 10 wherein said photonegative sheet is transilluminated with ambient light to develop the desired image of information while integrating the amount of ambient light incident on the photosensitive negative sheet until said sheet has been exposed to the desired amount of light.

References Cited

UNITED STATES PATENTS

| | | | |
|---|---|---|---|
| 1,973,512 | 9/1934 | Smith | 95—73 |
| 2,359,784 | 10/1944 | Paulas. | |
| 2,435,717 | 2/1948 | Land | 95—89 XR |
| 2,906,399 | 9/1959 | Lysle et al. | 95—89 X |
| 3,147,684 | 9/1964 | Gold et al. | 95—75 |
| 3,320,865 | 5/1967 | Good | 95—13 |

NORTON ANSHER, *Primary Examiner.*

FRED L. BRAUN, *Assistant Examiner.*